(12) United States Patent
Lee et al.

(10) Patent No.: US 10,363,785 B2
(45) Date of Patent: Jul. 30, 2019

(54) TOW HOOK SEAL ASSEMBLY WITH INTEGRATED BUMPER BOLT COVER

(71) Applicant: FORD GLOBAL TECHNOLOGIES, LLC, Dearborn, MI (US)

(72) Inventors: Jeffery Lee, Tecumseh (CA); David Brian Glickman, Southfield, MI (US); Joseph Andrew Hickey, Rochester, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 867 days.

(21) Appl. No.: 14/961,449

(22) Filed: Dec. 7, 2015

(65) Prior Publication Data
US 2017/0158009 A1  Jun. 8, 2017

(51) Int. Cl.
*B60D 1/60* (2006.01)
(52) U.S. Cl.
CPC ................................. *B60D 1/605* (2013.01)
(58) Field of Classification Search
CPC . B60D 1/60; B60D 1/605; B60D 1/56; B60D 1/565
USPC .......................................... 280/507; 293/117
See application file for complete search history.

(56) References Cited

U.S. PATENT DOCUMENTS

| 2,342,907 | A | * | 2/1944 | Stall | B60D 1/60 280/501 |
|---|---|---|---|---|---|
| 2,510,782 | A | * | 6/1950 | Johnson | B60D 1/60 280/502 |
| 2,521,356 | A | * | 9/1950 | Frederick | B60D 1/60 280/500 |
| 2,601,993 | A | * | 7/1952 | McCall | B60D 1/56 280/501 |
| 2,671,675 | A | * | 3/1954 | Swaisgood | B60D 1/60 280/507 |
| 2,752,170 | A | * | 6/1956 | Eversole | B60D 1/60 280/502 |
| 3,814,461 | A | * | 6/1974 | Rhody | B60R 9/00 410/108 |
| 4,109,930 | A | * | 8/1978 | Pilhall | B60D 1/54 280/491.4 |
| 4,852,902 | A | * | 8/1989 | Young | B60D 1/60 280/507 |

(Continued)

FOREIGN PATENT DOCUMENTS

| CN | 203876510 U | 10/2014 |
|---|---|---|
| DE | 202006003544 U1 | 6/2006 |
| JP | 2012035691 A | 2/2012 |

OTHER PUBLICATIONS

English machine translation of CN203876510U.
English machine translation of DE202006003544U1.
English machine translation of JP2012035691A.

*Primary Examiner* — Joseph M Rocca
*Assistant Examiner* — Conan D Duda
(74) *Attorney, Agent, or Firm* — Jason Rogers; Vichit Chea; King & Schickli, PLLC (57) ABSTRACT

A tow hook seal assembly is provided for a motor vehicle. That tow hook seal assembly includes a housing and a tow hook seal held in the housing. Further the tow hook seal assembly includes a first bumper bolt opening and a second bumper bolt opening. In addition, the tow hook seal assembly includes a cover carried on the housing and enclosing the first and second bumper bolt openings when the cover is in the closed position.

11 Claims, 8 Drawing Sheets

(56) References Cited

U.S. PATENT DOCUMENTS

| | | | | |
|---|---|---|---|---|
| 5,251,473 A * | 10/1993 | Reese | ............... | B60S 5/02 137/264 |
| 5,489,111 A * | 2/1996 | Collins | ............... | B60D 1/52 280/491.5 |
| 5,560,631 A * | 10/1996 | Salvo | ............... | B60D 1/60 280/507 |
| 5,564,588 A * | 10/1996 | Reese | ............... | B60S 5/02 220/565 |
| 5,628,536 A * | 5/1997 | Fulkerson | ............... | B60D 1/54 280/507 |
| 5,934,699 A * | 8/1999 | Blake | ............... | B60D 1/60 280/155 |
| 6,019,386 A * | 2/2000 | Morelock | ............... | B60D 1/60 280/420 |
| 6,149,181 A * | 11/2000 | Biederman | ............... | B60D 1/485 280/491.1 |
| 6,189,910 B1 * | 2/2001 | Bartel | ............... | B60D 1/06 280/491.1 |
| 6,439,595 B1 * | 8/2002 | Cheng | ............... | B60D 1/06 280/507 |
| 6,481,734 B1 * | 11/2002 | Blake | ............... | B60D 1/60 280/186 |
| 6,874,806 B1 * | 4/2005 | Blake | ............... | B60D 1/485 150/166 |
| 6,971,663 B1 * | 12/2005 | Blake | ............... | B60D 1/60 280/155 |
| 8,056,920 B2 * | 11/2011 | Knie | ............... | B66F 9/07527 172/112 |
| 8,678,423 B1 * | 3/2014 | Hwang | ............... | B60R 19/34 280/495 |
| 9,199,593 B2 * | 12/2015 | Fritsch | ............... | B60R 19/44 |
| 9,555,677 B1 * | 1/2017 | Merino Almeida | ..... | B60D 1/60 |
| 2002/0041078 A1 * | 4/2002 | Aquinto | ............... | B60D 1/485 280/500 |
| 2002/0125686 A1 * | 9/2002 | Blake | ............... | B60D 1/065 280/507 |
| 2004/0046360 A1 * | 3/2004 | Bagley | ............... | B60D 1/60 280/507 |
| 2004/0046361 A1 * | 3/2004 | Lewis | ............... | B60D 1/60 280/507 |
| 2004/0104557 A1 * | 6/2004 | Kaepp | ............... | B60D 1/485 280/495 |
| 2005/0121880 A1 * | 6/2005 | Santangelo | ............... | B60D 1/60 280/507 |
| 2005/0275194 A1 * | 12/2005 | Wegener | ............... | B60D 1/56 280/500 |
| 2007/0222184 A1 * | 9/2007 | Christopher | ............... | B60D 1/46 280/495 |
| 2009/0039618 A1 * | 2/2009 | Takemura | ............... | B60D 1/60 280/507 |
| 2011/0088228 A1 * | 4/2011 | Mineshima | ............... | B60R 19/023 24/682.1 |
| 2011/0133499 A1 * | 6/2011 | Hope | ............... | B60R 9/06 293/117 |
| 2012/0066979 A1 * | 3/2012 | Brown | ............... | B60R 19/48 49/463 |
| 2013/0147157 A1 * | 6/2013 | Lee | ............... | B60D 1/54 280/491.1 |
| 2013/0313839 A1 * | 11/2013 | Abe | ............... | B60R 19/50 293/117 |
| 2014/0015225 A1 * | 1/2014 | Corless | ............... | B60D 1/60 280/507 |
| 2014/0070518 A1 * | 3/2014 | Sarajian | ............... | B60D 1/605 280/507 |
| 2015/0076793 A1 * | 3/2015 | Belinky | ............... | B60D 1/605 280/506 |
| 2016/0176373 A1 * | 6/2016 | Weigand | ............... | B60R 19/48 293/117 |
| 2017/0057312 A1 * | 3/2017 | Baron | ............... | B60D 1/06 |
| 2017/0136837 A1 * | 5/2017 | Merino Almeida | ..... | B60D 1/60 |
| 2017/0136838 A1 * | 5/2017 | Merino Almeida | ..... | B60D 1/54 |

* cited by examiner

TOW HOOK SEAL ASSEMBLY WITH INTEGRATED BUMPER BOLT COVER

TECHNICAL FIELD

This document relates generally to the motor vehicle field and, more particularly, to a tow hook seal assembly incorporating an integrated cover adapted to conceal bolts utilized in a tow hook area to secure the bumper to the frame of the motor vehicle.

BACKGROUND

Motor vehicle manufacturers have long utilized bumper bolts adjacent a tow hook in order to secure the bumper to the frame of the motor vehicle. Many consider such exposed bolts unsightly and a hindrance to the presentation of a clean and aerodynamic appearance. Over time, such bolts may also present a corrosion concern potentially leading to unsightly indications of rust.

This document relates to a new and improved tow hook seal assembly incorporating an integrated cover that overlies the bumper bolts to provide a clean and more aesthetically pleasing appearance.

SUMMARY

In accordance with the purposes and benefits described herein, a tow hook seal assembly is provided. That tow hook seal assembly may be broadly described as comprising a housing, a tow hook seal held in the housing and a bumper bolt opening in the housing. Further, the tow hook seal assembly includes a cover. That cover is carried on the housing. When closed, the cover overlies and conceals a bumper bolt in the bumper bolt opening.

The housing of the tow hook seal assembly may include a cover mounting flange and a channel. The cover of the tow hook seal assembly may include a snap tang that engages with the mounting flange and an install guide received in the channel.

In accordance with an additional aspect, a tow hook seal assembly comprises a housing, a tow hook seal held in the housing, a first bumper bolt opening and a second bumper bolt opening. The tow hook seal assembly further includes a cover carried on the housing. The cover overlies and conceals a first bumper bolt and a second bumper bolt held in the first and second bumper bolt openings.

The tow hook seal may be positioned between the first bumper bolt opening and the second bumper bolt opening.

The cover may be U-shaped. Such a cover includes a first section covering the first bumper bolt opening, a second section covering the second bumper bolt opening and a bridge section connecting the first and second sections together.

The housing may include a first cover mounting flange and a first channel. The cover may include a first snap tang engaging the first cover mounting flange and a first install guide received in the first channel. In such an embodiment, the first bumper bolt opening may be provided between the first cover mounting flange and the first install guide.

Further, the housing may include a second cover mounting flange and a second channel and the cover may include a second snap tang engaging the second cover mounting flange and a second install guide received in the second channel. In such an embodiment, the second bumper bolt opening may be provided between the second cover mounting flange and the second install guide.

In an alternative embodiment, the cover of the tow hook seal assembly may include a hinge and a snap latch. Further, the cover may include a spring for biasing the cover into an open position uncovering and allowing access to a first bumper bolt in the first bumper bolt opening and a second bumper bolt in the second bumper bolt opening. In addition the housing may include a striker engaged by the snap latch when the cover is in a closed position.

In accordance with an additional aspect, a motor vehicle is provided incorporating the tow hook seal assembly.

In accordance with yet another aspect, a method is provided for improving the aesthetic appearance of a motor vehicle. That method may be broadly described as comprising the step of providing a tow hook seal assembly with a bolt cover for concealing a bumper bolt that secures a bumper to the frame of the motor vehicle. Further, that method may include the step of securing the bolt cover in a closed position overlying and concealing the bumper bolt.

In the following description, there are shown and described several preferred embodiments of the tow hook seal assembly. As it should be realized, the tow hook seal assembly is capable of other, different embodiments and its several details are capable of modification in various, obvious aspects all without departing from the tow hook seal assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the tow hook seal assembly and together with the description serve to explain certain principles thereof. In the drawing figures.

Reference will now be made in detail to the present preferred embodiments of the tow hook seal assembly, examples of which are illustrated in the accompanying drawing figures.

DETAILED DESCRIPTION

Figure 1A:
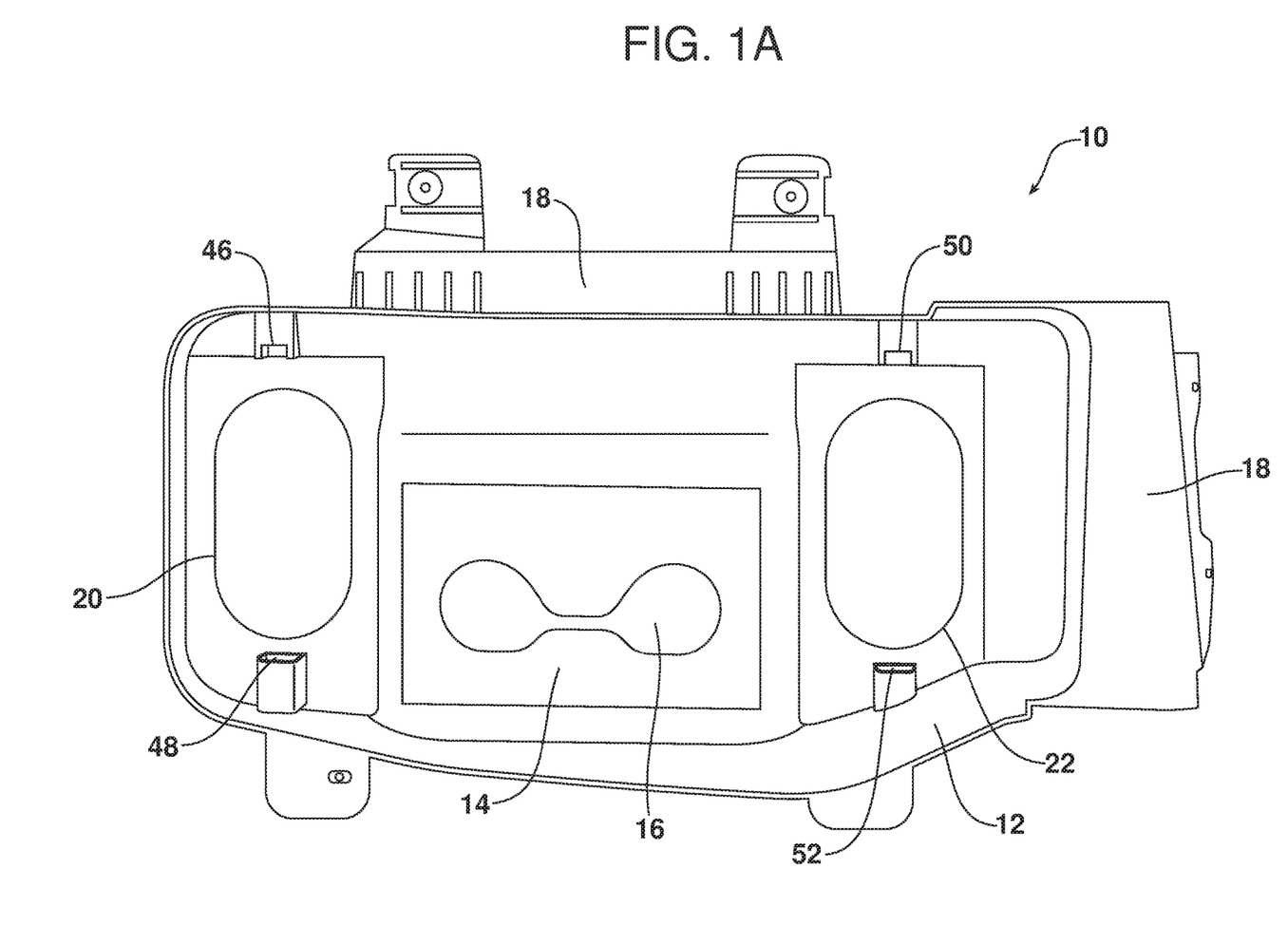
FIG. 1A is a front plan view of the tow hook seal assembly with the cover removed.
Figure 1B:
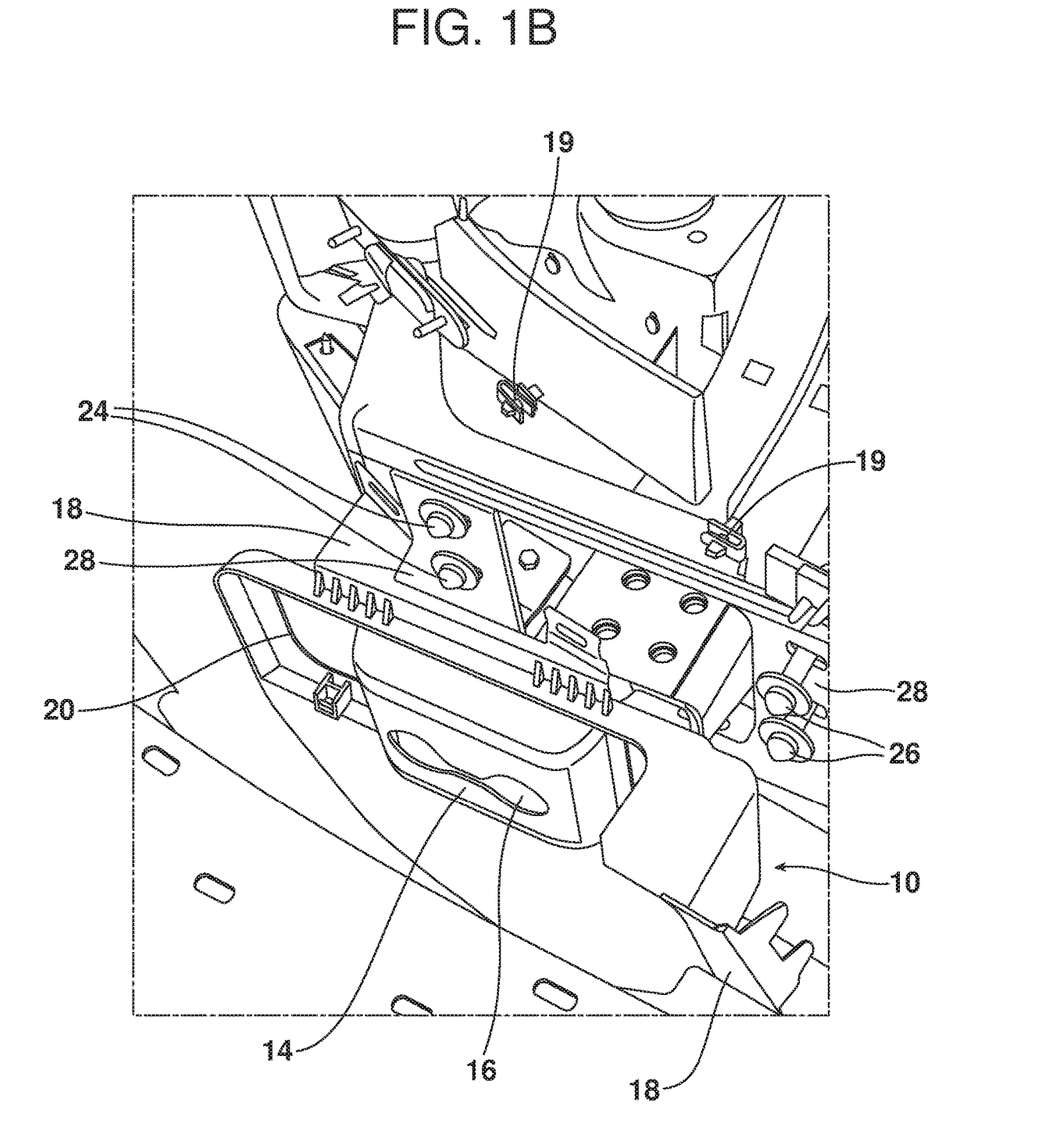
FIG. 1B is a partially exploded perspective view illustrating the tow hook seal assembly, the bumper and the bumper bolts.

Reference is now made to FIGS. 1A-5 illustrating a first embodiment of a tow hook seal assembly 10. As best illustrated in FIG. 1, the tow hook seal assembly 10 includes a housing 12 that may be molded from a plastic or composite material. The housing 12 holds a tow hook seal 14 that may be made from a rubber or an elastomeric material and includes an opening 16 through which a tow hook (not shown) projects.

As best illustrated in FIGS. 1A and 1B, the housing 12 may include various integral mounting flanges or lugs 18 for securing the housing 12 to the motor vehicle by fasteners 19. Further, the housing 12 includes a first bumper bolt opening 20 and a second bumper bolt opening 22. In the illustrated embodiment, the tow hook seal 14 is positioned or provided between the two bumper bolt openings 20, 22.

Figure 2:
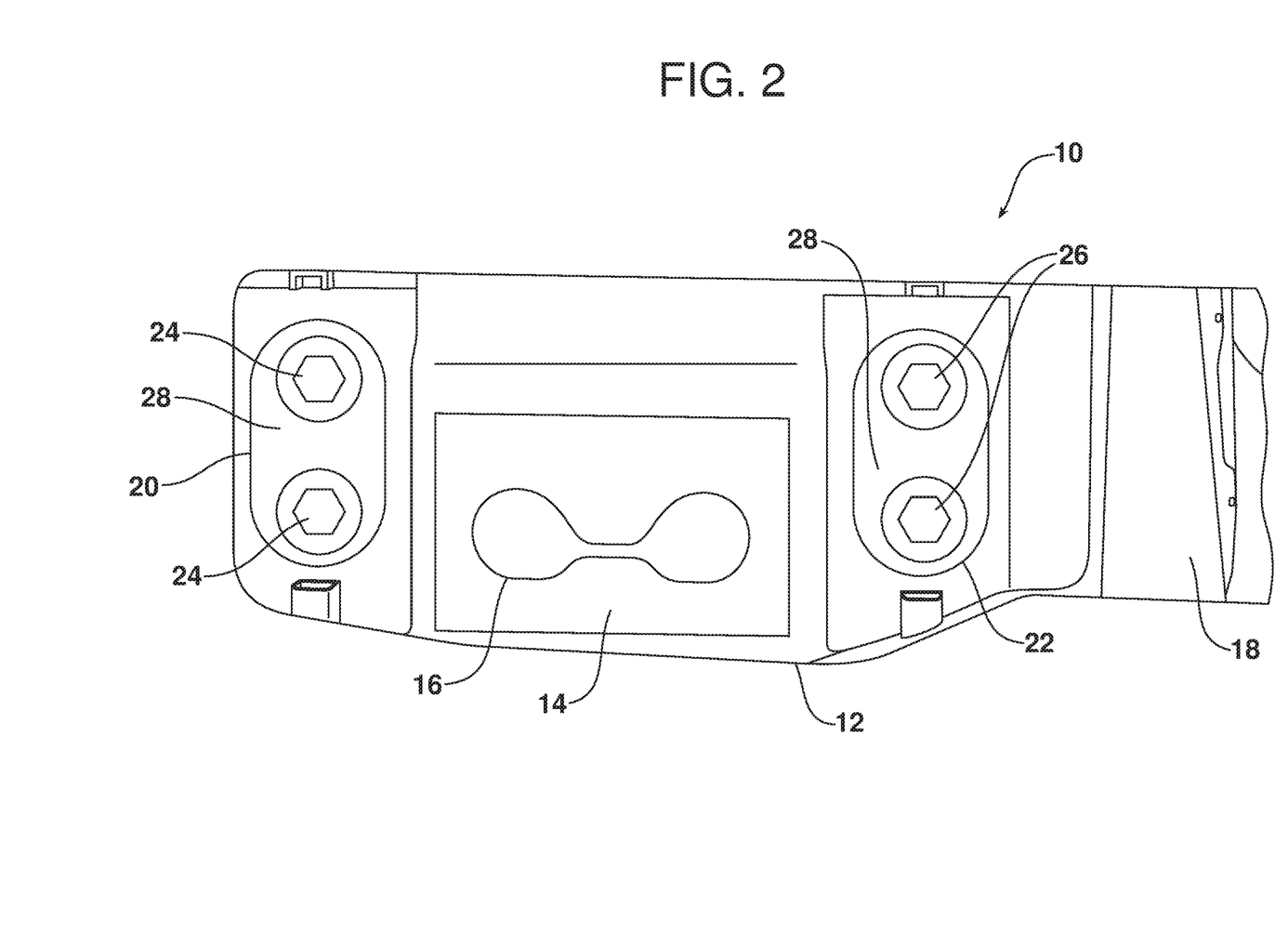
FIG. 2 is a front plan view of the tow hook seal assembly illustrating how the bumper bolts are provided in the bumper bolt openings of the tow hook seal assembly.

Reference is now made to FIG. 2 illustrating the housing 12 of the tow hook seal assembly 10 on the front of a motor vehicle. As shown, a first set of bumper bolts 24 and a second set of bumper bolts 26 secure the bumper 28 to the frame of the motor vehicle. The housing 12 overlies the bumper 28 with the first bumper bolt opening 20 aligned with and allowing access to the first set of bumper bolts 24 and the second bumper bolt opening 22 aligned with and allowing access to the second set of bumper bolts 26.

Figure 3:
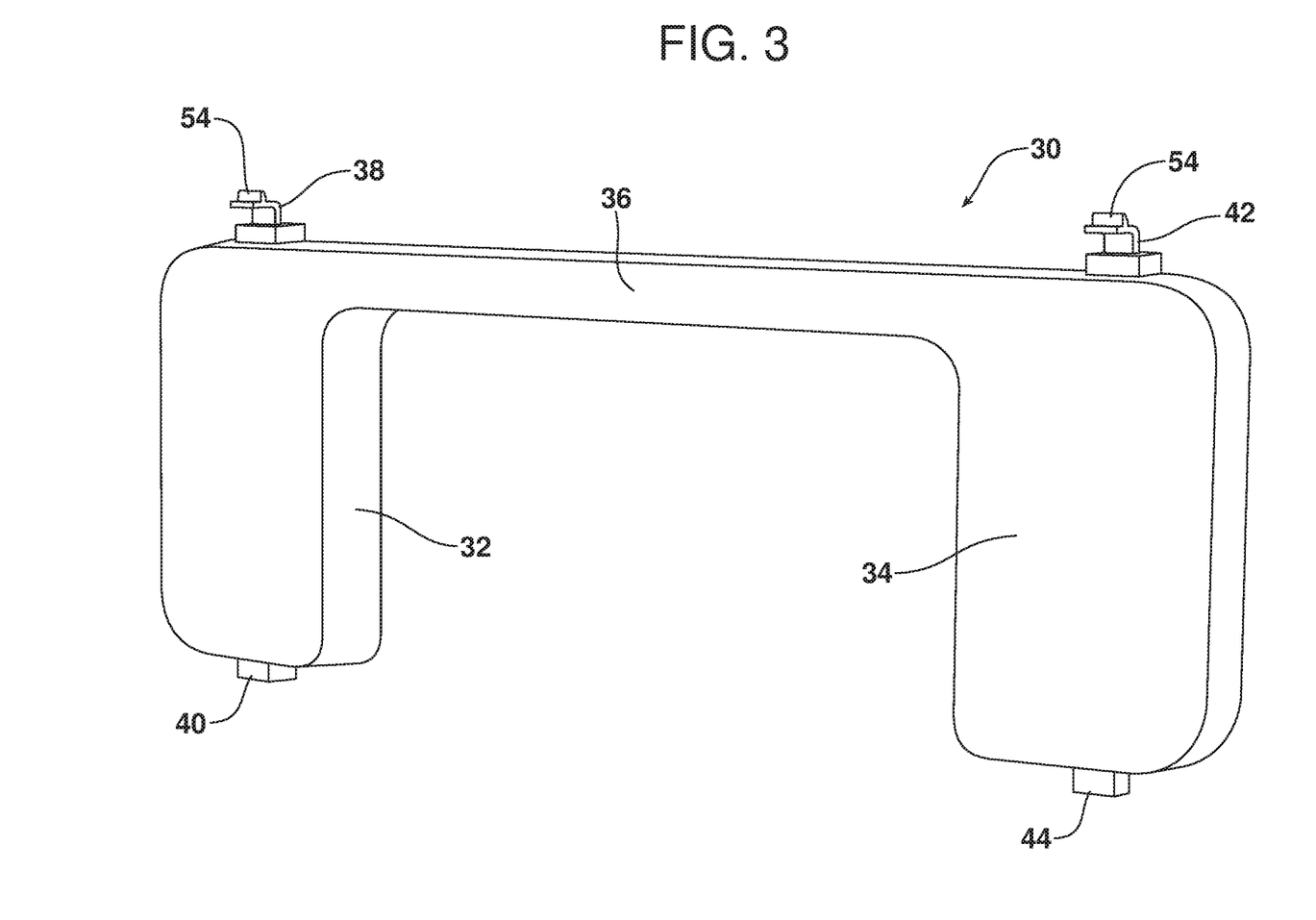
FIG. 3 is a detailed perspective view of a first embodiment of the cover that is carried on the housing.
Figure 4:
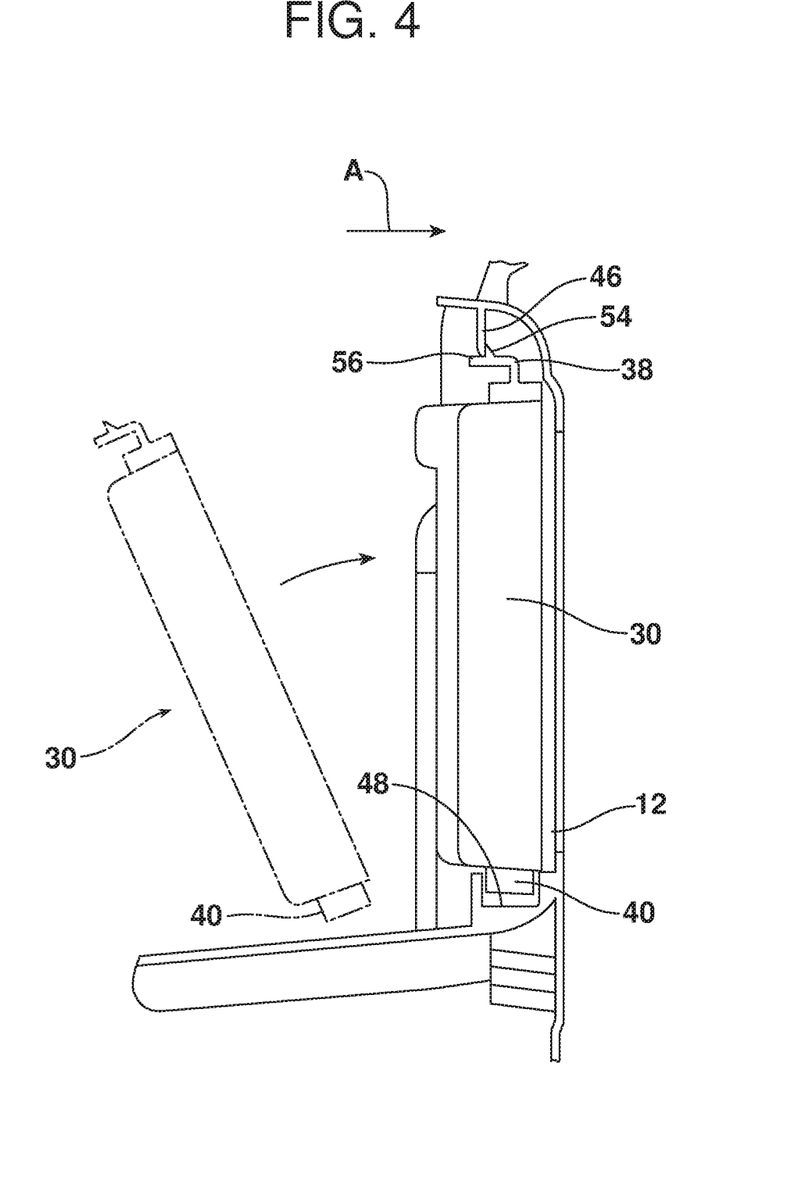
FIG. 4 is a schematic side view illustrating how the cover is secured to the housing of the tow hook seal assembly.
Figure 5:
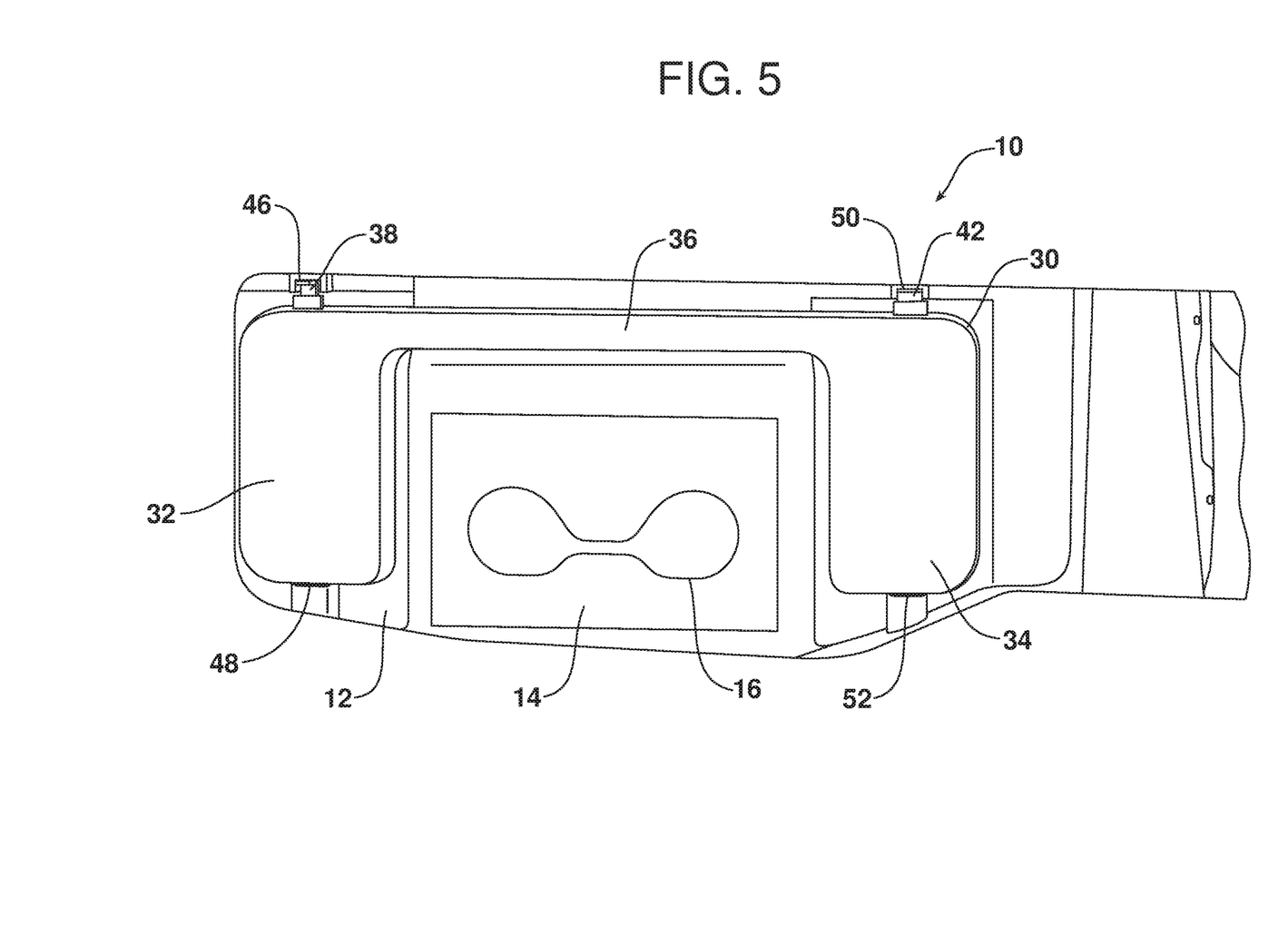
FIG. 5 is a front elevational view illustrating the cover in a closed position on the housing overlying the bumper bolts and closing the bumper bolt openings provided in the housing.

As illustrated in FIGS. 3-5, the tow hook seal assembly 10 also includes a cover 30. In the illustrated embodiment, the cover 30 includes a first section 32 for covering the first bumper bolt opening 20, a second section 34 for covering the second bumper bolt opening 22 and a bridge section 36 connecting the first and second sections together.

As should be further appreciated from reviewing FIG. 3, the cover 30 includes a first snap tang 38 and a first install guide 40 opposed to the first snap tang. Further, the cover 30 includes a second snap tang 42 and a second install guide 44 opposed to the second snap tang.

As best illustrated in FIG. 1A, the housing 12 includes a first cover mounting flange 46 and a first channel 48 opposed to the first cover mounting flange. The first bumper bolt opening 20 is provided between the first cover mounting flange 46 and the first channel 48.

In addition, the housing 12 also includes a second cover mounting flange 50 and a second channel 52 opposed to the second cover mounting flange. As illustrated, the second bumper bolt opening 22 is provided on the housing 12 between the second cover mounting flange 50 and the second channel 52.

Reference is now made to FIG. 4 illustrating how the cover 30 is mounted onto the housing 12. As shown in phantom line, the cover 30 is tilted slightly with respect to the housing 12 with the first install guide 40 aligned with the first channel 48 and the second install guide 44 aligned with the second channel 52. The two install guides 40, 44 are then inserted into the first and second channels 48, 52 and the cover 30 is then pivoted or rotated until the first snap tang 38 engages with the first cover mounting flange 46 and the second snap tang 42 engages with the second cover mounting flange 50. The cover 30 is then pressed in the direction of action arrow A until the locking lugs 54 on the snap tangs 38, 42 engage behind he cover mounting flanges 46, 50 thereby securing the cover in the closed position illustrated in FIG. 5.

When in the closed position, the cover 30 is an integral part of the housing 12 that closes the first and second bumper bolt openings 20, 22 and conceals the first and second set of bumper bolts 24, 26. Thus, the tow hook seal assembly 10 provides a cleaner and more aesthetically appealing appearance by hiding the bumper bolts 24, 26 from view and even protecting them from the elements and potential corrosion. See FIG. 5.

When desired, the cover 30 may be easily removed by, for example, engaging the top of the snap tangs 38, 42 with a screwdriver or other tool at the point 56 (see FIG. 4) and pressing downward to release the locking lugs 54 from the cover mounting flanges 46, 50 thereby allowing the cover to be pivoted away and removed from the housing 12.

Figure 6:
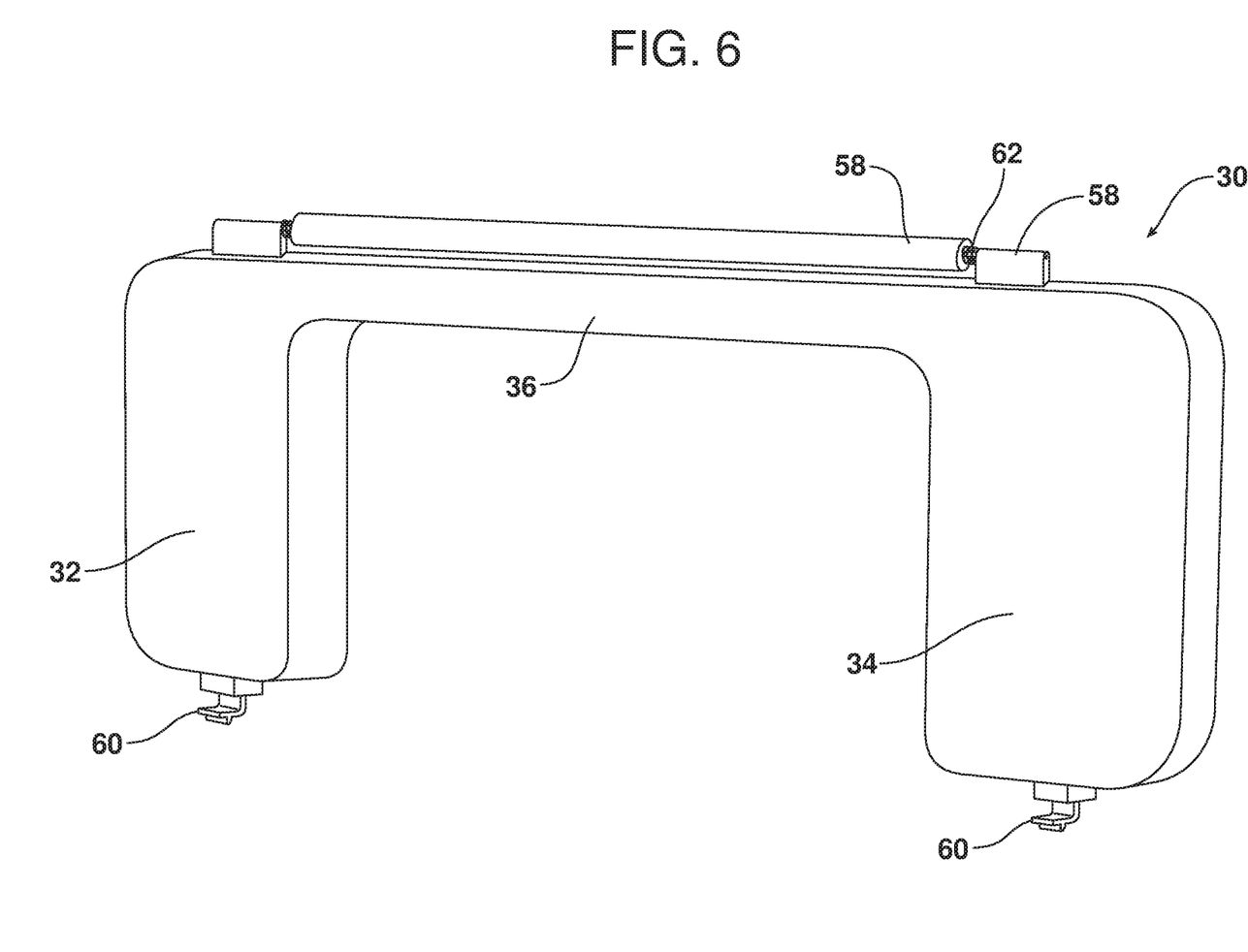
FIGS. 6 and 7 illustrate an alternative embodiment of the cover including a spring loaded hinge and a snap latch.
Figure 7:
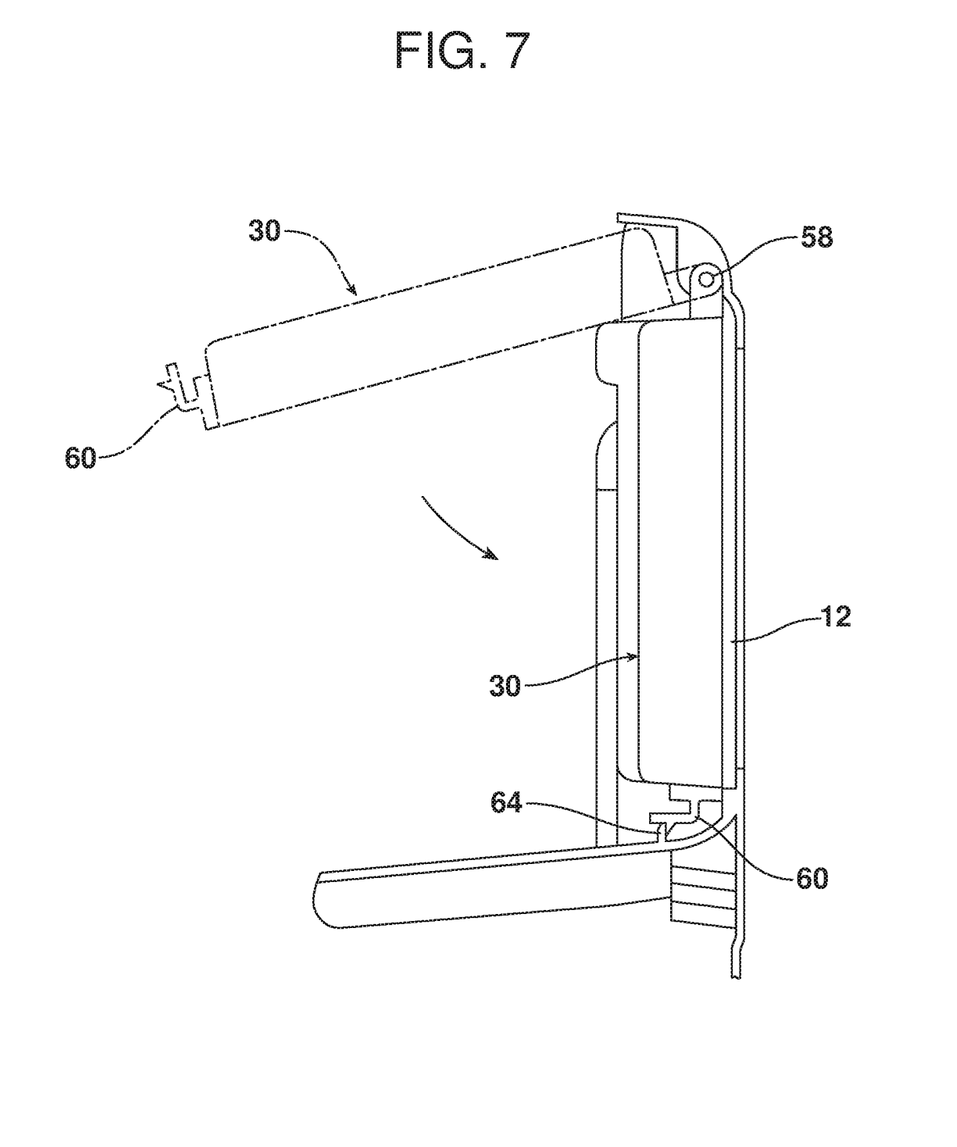

Reference is now made to FIGS. 6 and 7 illustrating an alternative embodiment of the cover 30 which includes a hinge 58 instead of the snap tangs 38, 42 and a snap latch 60 instead of the install guides 40, 44. As further illustrated, the cover 30 of the alternative embodiment also includes a spring 62 thereby providing a spring loaded hinge structure. As illustrated in FIG. 7, the spring 62 biases the cover 30 into the open position illustrated in phantom line. When one wishes to close the cover 30, a cover is pivoted about the hinge 58 against the force of the biases spring 62 until the snap latch 60 is received in and fully engages the flange or striker 64 integrally molded into the housing 12 thereby holding the cover in a closed a position.

As should be appreciated from the above, a method of improving the aesthetic appearance of the motor vehicle is also provided. That method includes the step of providing a tow hook seal assembly 10 with a bolt cover 30 for concealing one or more bumper bolts 24, 26 that secure a bumper 28 to the frame of the motor vehicle. Further that method may include the step of securing a bolt cover 30 in a closed position overlying and concealing the bumper bolt or bumper bolts 24, 26 as illustrated in FIG. 5.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A tow hook seal assembly for a vehicle, comprising:
   a housing;
   a tow hook seal held in said housing;
   a first bumper bolt opening;
   a second bumper bolt opening; and
   a cover carried on said housing, wherein said cover is U-shaped from a front elevation view of the vehicle and has a first section enclosing a first bumper bolt in said first bumper bolt opening, a second section enclosing a second bumper bolt in said second bumper bolt opening and a bridge section connecting said first section and said second section.

2. The tow hook seal assembly of claim 1, wherein said tow hook seal is positioned between said first bumper bolt opening and said second bumper bolt opening.

3. The tow hook seal assembly of claim 2, wherein said housing includes a first cover mounting flange and a first channel and said cover includes a first snap tang engaging said first cover mounting flange and a first install guide received in said first channel.

4. The tow hook seal assembly of claim 3, wherein said first bumper bolt opening is between said first cover mounting flange and said first install guide.

5. The tow hook seal assembly of claim 4, wherein said housing includes a second cover mounting flange and a second channel and said cover includes a second snap tang engaging said second cover mounting flange and a second install guide received in said second channel.

6. The tow hook seal assembly of claim 5, wherein said second bumper bolt opening is between said second cover mounting flange and said second install guide.

7. The tow hook seal assembly of claim 2, wherein said cover includes a hinge and a snap latch.

8. The tow hook seal assembly of claim 7, further including a spring for biasing said cover into an open position uncovering and allowing access to said first bumper bolt in said first bumper bolt opening and said second bumper bolt in said second bumper bolt opening.

9. The tow hook seal assembly of claim 8, wherein said housing includes a striker engaged by said snap latch when said cover is in a closed position.

10. A motor vehicle incorporating the tow hook seal assembly of claim 1.

11. A tow hook seal assembly for a vehicle, comprising:
a housing;
a tow hook seal held in said housing;
a first bumper bolt opening;
a second bumper bolt opening; and
a cover having a U-shape from a front elevation view of the vehicle and including a first section covering said first bumper bolt opening, a second section covering said second bumper bolt opening and a bridge section connecting said first section and said second section.

\* \* \* \* \*